Sept. 26, 1950  F. A. SATTLER ET AL  2,523,999
POLYESTER-AMIDE COMPOSITIONS AND INSULATED
CONDUCTORS PREPARED THEREFROM
Filed April 23, 1948
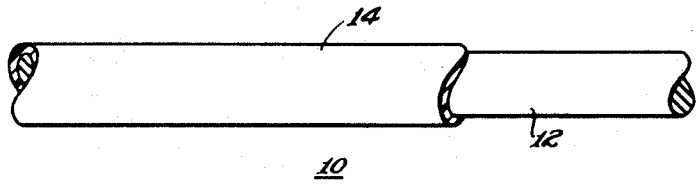
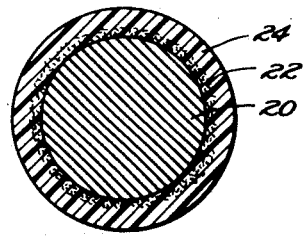
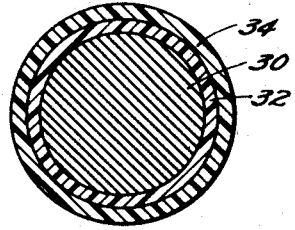
WITNESSES.
Robert C. Baird
Wm. C. Groome
INVENTORS
Frank A. Sattler and
John R. Womer.
BY
Frederick Shapoe
ATTORNEY Patented Sept. 26, 1950

2,523,999

UNITED STATES PATENT OFFICE 2,523,999

POLYESTER-AMIDE COMPOSITIONS AND INSULATED CONDUCTORS PREPARED THEREFROM

Frank A. Sattler, Pittsburgh, and John R. Womer, New Alexandria, Pa., assignors to Westinghouse Electric Corporation, East Pittsburgh, Pa., a corporation of Pennsylvania Application April 23, 1948, Serial No. 22,904

18 Claims. (Cl. 260—16)

This invention relates to synthetic polyesteramide resin compositions which are particularly suitable for application to metallic conductors for producing enameled insulating coatings thereon.

It is well known to those skilled in the art that the requirements imposed on enamel coatings on wire are so severe and critical that very few, if any, other applications for resinous materials set as high a standard. Enamel coatings on wire must be both tough and hard in order to withstand the severe mechanical abuse to which the wire is subjected in service. Thus coils are often wound from enameled wire under considerable pressure and at high speeds. The enamel must withstand the abrasion, the bending stresses and the heavy unit pressures encountered without disrupting from the wire or cracking. In many cases, the conductor is severely deformed beyond the elastic limit by such operations. Thus in automatic coil winding machines, such as are used in winding electric motors, enameled wire may be twisted, stretched and bent to such an extent that the copper wire may be elongated 10% and more. A good enamel coating on the wire must withstand this abuse without separating from the wire, breaking, or cracking.

After coils are wound, they may be baked at temperatures as high as 150° C., usually exposed to air during baking, and dipped in hot varnishes containing one or more of a variety of organic solvents while subjected to similar elevated temperatures. The enamel coating on wire must be resistant to the action of oils, greases, water, grit and dust and various atmospheres that may be encountered in industry. Motors for refrigerator service are usually immersed in a refrigerant which may comprise a halogenated liquid, such for example as dichlorodifluoromethane, and oil. No appreciable dissolution of the enamel coating on the motor windings must take place under these conditions, otherwise the motor windings will fail. It will be apparent that the physical and the chemical properties of the enamel must be outstanding.

Other further conditions must be met by a resinous composition before it can be considered entirely satisfactory for application to wire to provide an insulating enamel coating thereon. It must be capable of being dissolved in commercially available solvents to produce wire enamel solutions having a relatively high resin solids content without excessive viscosity. Wire enamels so prepared should exhibit stability in storage for long periods of time so that marked changes or precipitation do not occur. The wire enamel solutions when applied to wire should be capable of being satisfactorily baked or heat treated within a reasonably wide range of temperatures in the process of curing the resin composition on the wire. The applied baked coating of resin should be smooth and free from pinholes or other flaws. Furthermore, a thin coating of the cured enamel should possess a high dielectric strength and have desirable electrical insulating properties.

In evaluating coatings of enamel on a wire, the art has accepted certain tests as indicative of the merit of such enamels. The primary test employed by the art today is designated as the scrape value. The scrape value indicates the relative hardness and toughness of an enamel. The scrape value is determined by passing the enameled wire under a loaded knife-edge, and increasing the load until it is sufficient to cause the knife-edge to cut through the enamel, this least load in ounces doing so is designated as the scrape value. It is believed that the scrape testing machine disclosed in C. B. Leape Patent 2,372,093, gives the most accurate scrape values of any device known at the present time, being reproducible to within one ounce. The scrape values indicated hereinafter have all been determined with this machine. It may be stated that any commercially usable enameled wire should have a scrape value of at least 15 ounces and preferably higher than 20 ounces for single thickness coating on size 20 wire and proportionate values for other wire sizes. Values of 30 ounces and higher for wire of the order of size 20 are exceptional.

The relative solvent and hot-varnish resistance of the enameled wire is indicated by the change in scrape value after subjecting an enameled wire to the action of various solvents for selected periods of time. Of two enamels the one that changes the least in scrape value after being immersed for 24 hours or more in a given solvent is stated to have the higher resistance to the solvent.

Other tests are usually applied to enameled wire to indicate certain other desirable characteristics. The "quick-jerk" test is applied to enameled wire by giving the wire a quick jerk to cause it to break. The enamel should be substantially continuous, without exhibiting cracks, up to the point of the break. This test indicates the adherence of the enamel to the wire as well as the elasticity of the enamel, both being desirable characteristics. The "heat-shock" test consists in winding a coil over a conical mandrel or a mandrel having various diameters, the smallest diameter being the same as the wire being tested, and placing the coil in an oven at elevated temperature. The smallest diameter mandrel that the wire can be wound on without cracking after placing in the oven is an indication of the relative abuse that the wire can stand in manufacture and service without failure. Electrical tests to indicate dielectric strength are employed to indicate the relative electrical insulating merits of the resin coatings.

The object of the invention is to provide a synthetic resin capable of application to wire or conductors as an insulating enamel which exhibits outstanding physical and electrical properties and which possesses isotropic characteristics particularly adapting it to the uses to which enameled wire is subjected.

A further object of the invention is to provide conductors insulated with an isotropic polyester-amide type resin.

Another object of this invention is to provide a polyester-amide type of resinous composition which, when cured, is highly isotropic and substantially free from crystallinity or fiber structure, both in the stretched and in the unstrained condition.

Other objects of the invention will, in part, be obvious and will, in part, appear hereinafter.

For a fuller understanding of the nature and objects of the invention, reference should be had to the following detailed description and drawing, in which:

Figure 1 is a fragmentary view, in elevation, partly broken, of an enameled conductor;

Fig. 2 is a cross-section through a conductor insulated in accordance with the invention; and Fig. 3 is a view in cross-section of a modified form of insulated conductor.

We have discovered that certain isotropic polyester-amide resinous compositions may be prepared by reacting a combination of unsaturated dicarboxylic acids or anhydrides thereof, saturated dicarboxylic organic acids, polyhydric alcohols and primary alcohol-amines. In some instances, certain aliphatic primary diamines may be reacted in the composition. Furthermore, the composition may contain a proportion of an aliphatic unsaturated monocarboxylic fatty acid having from 16 to 18 carbon atoms in a straight chain terminating in a carboxyl group. In preparing the compositions, from 3.0 to 4.5 moles of at least one of the unsaturated dicarboxylic acids are selected from the group of acidic compounds consisting of maleic acid, fumaric acid, maleic anhydride, citraconic acid and citraconic anhydride. The saturated dicarboxylic acid comprises between 0.5 and 2.0 moles of at least one saturated dicarboxylic aliphatic acids or ether acids having from 2 to 8 atoms linked in a straight chain between and attached to the carboxyl groups and having no other reactive groups than the carboxyl groups. Examples of the saturated dicarboxylic acids are succinic acid, glutaric acid, pimelic acid, adipic acid, suberic acid, azelic acid, sebacic acid and diglycolic acid.

The primary amine alcohol is selected from the group consisting of monoethanolamine and monoisopropanolamine in an amount from 2.2 to 4.7 moles. Mixtures of both the primary amine alcohols may be employed as well as either one alone.

The composition includes from 1 to 2.4 moles of at least one polyhydric alcohol selected from the group consisting of glycerol, pentaerythritol and aliphatic glycols having from 1 to 8 carbon atoms and no other reactive group than the two hydroxyl groups. The polyhydric alcohol, however, should be so proportioned that not more than 50% of the hydroxyl groups are supplied by the glycols. Suitable glycols are ethylene glycol, propylene glycol, diethylene glycol, 1,5-pentanediol and triethylene glycol.

The primary amine-alcohol may be partly replaced by 0.6 mole of at least one primary diamino compound selected from the group consisting of ethylene diamine, 1,3-propylene diamine and urea. Each mole of the primary diamino compound replaces two moles of the primary alcohol-amine. The sum of the moles of the primary amine-alcohol plus twice the moles of the primary diamine should be at least 2.2 and not exceed 4.7.

Between 0.05 and 0.5 mole of an aliphatic unsaturated monocarboxylic fatty acid having from 16 to 18 carbon atoms in a straight chain terminating in the carboxyl group may be introduced and reacted simultaneously into the reaction product. Suitable fatty acids are tung oil fatty acids, linseed oil fatty acids, ricinoleic acid, oleic acid, linoleic acid and linolenic acid.

In reacting the components of the composition, it is preferable that proportions be so maintained that the carboxyl groups do not exceed a 10% stoichiometric excess over the combined alcohol and amine groups. A greater excess of total alcohol and amine groups can be tolerated, not to exceed a 20% stoichiometric excess over the carboxyl groups. In such proportioning, as is well known, an acid anhydride is equal to two carboxyl groups.

Highly satisfactory isotropic resins may be prepared by reacting the above components in the following four combinations and respective proportions:

A 3.0 to 4.5 moles of unsaturated dicarboxylic acids or anhydrides
0.5 to 2.0 moles of saturated dicarboxylic acids
2.2 to 4.7 moles of primary alcohol-amine
1 to 2.4 moles of polyhydric alcohol

B 3.0 to 4.5 moles of unsaturated dicarboxylic acids or anhydrides thereof
0.5 to 2.0 moles of saturated dicarboxylic acids
1.5 to 4.7 moles of primary amine-alcohol
1 to 2.4 moles of polyhydric alcohol
Up to 0.6 mole of primary diamino compound, where the sum of the moles of primary amine-alcohol plus twice the moles of diamino compound does not exceed 4.7

C 3.0 to 4.5 moles of unsaturated dicarboxylic acids or anhydrides
0.5 to 2.0 moles of saturated dicarboxylic acids
2.2 to 4.7 moles of primary alcohol-amine
1 to 2.4 moles of polyhydric alcohol
0.05 to 0.5 mole of unsaturated monocarboxylic fatty acid

D 3.0 to 4.5 moles of unsaturated dicarboxylic acids or anhydrides thereof
0.5 to 2.0 moles of saturated dicarboxylic acids
1.5 to 4.7 moles of primary amine-alcohol
1 to 2.4 moles of polyhydric alcohol
Up to 0.6 mole of primary diamino compound, where the sum of the moles of primary amine-alcohol plus twice the moles of diamino compound does not exceed 4.7
0.05 to 0.5 mole of unsaturated monocarboxylic fatty acid The above combinations A to D each should be proportioned so that the acidic compounds are within a stoichiometric balance with the total hydroxyl and amine groups, the acids being not over 10% in excess nor less than 20% deficient.

The reaction may be conducted either exposed to the atmosphere or in a closed reaction vessel sparged with an inert gas, such for example as nitrogen. The reaction is not critical as to the order in which the ingredients are admixed. It may be necessary to add some of the ingredients slowly in order that the initial reaction on contact be not too violent. After all the ingredients have been added, the reaction mixture may be heated at a rate to reach a temperature of from 140° C. to 210° C. in about one hour. However, the rate of heating ordinarily is preferably conducted more slowly with batches of 25 gallons and larger. For example, in a large reaction vessel, we have taken 10 hours to reach a temperature of 145° C. Good results have been attained when the rate of heating was such as to reach a temperature of 160° C. in the reaction vessel in six hours. Since the size of the reaction vessel, heating and cooling facilities, and other factors vary so much, no precise rule can be given for the rate of temperature rise. However, it is desirable that the maximum temperatures attained during reaction be within the range of 140° C. to 210° C. and the reaction continued at this temperature for a sufficient length of time to cause resinification to the point that the reaction product has a ball and ring temperature of from 45° C. to 90° C. If the ball and ring is substantially above 90° C., the resin will be jelled too much to be readily soluble in most solvents. Below a ball and ring temperature 45° C., the product is incompletely reacted and will not be suitable for its intended purposes.

A variety of volatile organic solvents may be employed for dissolving the polyester-amide reaction products. Cresol or phenol, or mixtures thereof, are excellent solvents. For use as wire enamels, we have secured good results using mixtures of solvents comprising 40% to 50% by weight of cresol or phenol or mixtures thereof, and the balance composed of one or more of the following: ethanol, propanol, isopropanol, monochlorobenzene, xylol and petroleum hydrocarbon distillates boiling in the range of from 130° C. to 185° C. A range of solutions containing from 5% to 60% of the polyester-amide resin of this invention have utility for most purposes such as dip coating, and die extrusion application to wire, for impregnation of coils, and the like. More specifically, 15% to 30% solutions have been found best suited for application to wire by dipping. More concentrated solutions may be applied to wire by dies. Solutions containing from 40% to 60% polyester-amide resin are suitable for impregnation of stators, field coils and the like; also for impregnating fabrics such as cotton, asbestos, and for paper.

The following examples illustrate the preparation of the reaction products of this invention.

Example I

The following reactants were employed:

| | Moles |
|---|---|
| Maleic anhydride | 3.89 |
| Adipic acid | 1.11 |
| Glycerol | 1.44 |
| Monoethanolamine | 2.44 |
| Ethylene diamine | 0.41 |

The acids and glycerol were introduced into a reaction kettle with stirring. The monoethanolamine and ethylene diamine were mixed with one another and then added slowly into the kettle, while continuing stirring. The monoethanolamine and ethylene diamine mixture was highly exothermic when added to the acid and glycerol mixture. The addition must be so conducted that the temperature of the reaction vessel does not reach above 140° C. A period of approximately twenty minutes to one-half hour is ordinarily sufficient for the ingredients to be combined. The reaction vessel was sparged with nitrogen and heat applied gradually until a temperature of 136° C. was reached, at which point water evolved by the reaction escaped at a moderate rate. The water vapor was condensed and removed. The temperature of the reaction vessel was increased gradually over a period of six hours until a temperature of 160° was reached. At the end of this period, the resinous product was highly viscous and the A. S. T. M. ball and ring softening temperature was 80° C. Meta-para cresol was added in an amount to produce a 50% solids solution and the solution so produced was cooled.

The cresol solution produced was diluted or thinned with a mixture of xylol and cresol to a 20% solids content. The solution so produced applied to copper wire by dip coating and baked in a conventional enameling tower produced red to dark mahogany coatings having excellent electrical insulating properties.

It has been found that desirable improvements in the properties of the enamel are produced by adding cellulose acetate to the polyester-amide resins in the proportion of from 1 to 10 parts of cellulose acetate to from 99 to 90 parts by weight of the polyester-amide resin. We have used cellulose acetate of a molecular weight such that a solution composed of 80% by weight of a mixture of acetone (90%) and ethanol (10%) and 20% cellulose acetate had a viscosity of from 700 to 1000 centipoises at 25° C. The cellulose acetate was dissolved in a solvent composed of phenol to provide a 20% cellulose acetate solution by weight and it was admixed with the polyester-amide solution of resin of Example I in proportions providing 5% of cellulose acetate and 95% of polyamide ester resin. This solution was applied to No. 19 (A. W. G.) copper wire and baked in an 8 foot enameling tower while passing therethrough at a speed of 14 feet a minute, the temperature of the oven being from 450° F. to 475° F., the wire being dipped six successive times. A cured enamel coating of 1.4 mils in thickness was produced. The scrape of the enamel on the No. 19 copper wire was from 39 to 41 ounces as determined with the testing machine disclosed in the Leape Patent 2,372,093 previously referred to. The best commercially available No. 19 enameled wire had a scrape of 30 ounces. The wire produced in accordance with this invention met all of the conventional tests perfectly, including the quick-jerk test and the heat-shock test. It exhibited excellent resistance to toluene and hot varnish. In the hot varnish test the enameled wire is stretched 25% and immersed in hot varnish for 20 hours kept at a temperature of 120° C. The enameled wire withstood both hot chlorinated diphenyl dielectrics at temperature of 120° C., and petroleum oils at the same temperature. It was completely inert to dichlorodifluoromethane refrigerants.

Enameled wire produced in accordance with this example showed outstanding thermal stability. Number 19 enameled wire was wound into coils on a glass rod of a diameter of 0.385 inch and several coils so produced were placed in an oven maintained at a temperature of 150° C., along with similar samples of the best commercially available enameled wire. Commercially available polyvinyl formal base enameled wire had turned black in two weeks in the oven, and at eight weeks the enamel was so brittle that slight flexing or stretching of the coils caused the enamel to flake off badly. By contrast, the enamel of this invention retained its color even after many months in the oven and showed no disruption of the enameled film on similar flexing and elongation of the enameled wire coils. Other tests indicate that the thermal stability of enamels of the present invention is such that it will withstand any given temperature at least 10 times as long as the best commercially available enamel on wire, and the relative thermal stability is even greater at temperatures above 150° C.

The composition of Example I was varied by increasing the moles of glycerol, monoethanolamine and ethylene diamine by 20%, the acids remaining constant, and the resinous product when applied to wire produced good enameled wire. In another experiment the moles of maleic anhydride and adipic acid were increased 10% and a satisfactory enamel resulted.

*Example II*

| | Moles |
|---|---|
| Maleic anhydride | 3.89 |
| Adipic acid | 1.11 |
| Glycerol | 1.17 |
| Monoethanolamine | 3.25 |

The acids and glycerol were admixed and then the monoethanolamine was added slowly in the manner set forth under Example I. The reaction product was then heated slowly until a temperature of 190° C. was reached in four hours. The resin was removed when it had a ball and ring temperature of 60° C. The resin was dissolved in an organic solvent composed of cresol and ethanol and applied to wire. Wire was also treated with this resin admixed with 3% of cellulose acetate. Both compositions produced excellent enameled wire. On No. 19 enameled wire, films of a thickness of 1.4 mils had a scrape of 28 to 30 ounces. The enameled wire met all of the tests employed to establish it as an excellent wire enamel.

*Example III*

| | Moles |
|---|---|
| Maleic anhydride | 3.89 |
| Fumaric acid | 0.55 |
| Adipic acid | 0.55 |
| Glycerol | 1.33 |
| Monoethanolamine | 3.00 |

The components were admixed as under Example I and reacted to a ball and ring temperature of 80° C. The resin was dissolved in organic solvents and applied to wire both with and without cellulose acetate. When applied to No. 19 wire in coatings of a thickness of 1.4 mils, it had a scrape of from 36 to 38 ounces. It also met all of the tests applied in determining a satisfactory wire enamel.

The following compositions were each prepared in a manner similar to Example I.

*Example IV*

| | Moles |
|---|---|
| Maleic anhydride | 4.08 |
| Adipic acid | 1.18 |
| Glycerol | 1.15 |
| 1,5-pentanediol | 0.57 |
| Monoethanolamine | 2.69 |
| Ethylene diamine | 0.43 |

*Example V*

| | Moles |
|---|---|
| Maleic anhydride | 3.89 |
| Adipic acid | 1.11 |
| Pentaerythritol | 0.44 |
| Ethylene glycol | 0.88 |
| Monoethanolamine | 3.25 |

*Example VI*

| | Moles |
|---|---|
| Maleic anhydride | 3.89 |
| Adipic acid | 1.11 |
| Glycerol | 1.17 |
| Ethylene glycol | 0.41 |
| Monoethanolamine | 2.44 |
| Urea | 0.41 |

*Example VII*

| | Moles |
|---|---|
| Maleic anhydride | 4.4 |
| Adipic acid | 0.50 |
| Tung oil fatty acids | 0.20 |
| Glycerol | 1.17 |
| Monoethanolamine | 3.25 |

*Example VIII*

| | Moles |
|---|---|
| Maleic anhydride | 4.0 |
| Adipic acid | 1.0 |
| Tung oil fatty acids | 0.20 |
| Glycerol | 1.92 |
| Monoethanolamine | 2.44 |
| Ethylene diamine | 0.41 |

*Example IX*

| | Moles |
|---|---|
| Maleic anhydride | 3.3 |
| Diglycolic acid | 1.7 |
| Glycerol | 1.44 |
| Monoethanolamine | 2.44 |
| Ethylene diamine | 0.41 |

*Example X*

| | Moles |
|---|---|
| Maleic anhydride | 4.26 |
| Sebacic acid | 0.74 |
| Glycerol | 1.435 |
| Monoethanolamine | 2.44 |
| Ethylene diamine | 0.41 |

*Example XI*

| | Moles |
|---|---|
| Maleic anhydride | 3.0 |
| Succinic acid | 2.4 |
| Glycerol | 1.52 |
| Monoethanolamine | 2.65 |
| Ethylene diamine | 0.45 |

Example XII

| | Moles |
|---|---|
| Maleic anhydride | 3.89 |
| Adipic acid | 1.11 |
| Pentaerythritol | 0.83 |
| Monoethanolamine | 3.25 |

The resinous compositions disclosed herein may be applied to electrical conductors composed of metals such as copper, silver, steel, aluminum or the like, or to carbon or graphite members or to other materials. Referring to Fig. 1 of the drawing, there is illustrated a conductor 10 comprising a copper conductor 12 coated with the hard, tough, solid resinous film 14 produced by applying a solution of the composition of this invention thereto and curing them by suitable baking or heat treatment. It will be understood that the coatings may be applied by any suitable means such for example as by dipping, die-coating, extrusion, or the like. After curing by baking, the resinous film 14 will be found to adhere tenaciously to the copper conductor 12. While the conductor 12 is illustrated as being of circular shape, it will be understood that it may be of any other desirable shape, such as square, rectangular or flat strip, or it may be composed of twisted or braided wire or the like. The enamel composition may have disposed therein suitable fillers, such as finely divided mica, silica, and iron oxide or coloring materials or the like.

It will be found that the film 14 is substantially non-crystalline and has a high degree of isotropicity so that its properties are substantially similar in all directions from any point in the film.

The composition of this invention may be applied to electrical conductors such as wire, in combination with coatings of both organic and inorganic fibrous materials. One form of this modification of the invention is illustrated in Fig. 2 of the drawing showing an electrical conductor 20 of copper, for example, carrying a layer 22 of fibrous material which may be glass fibers, asbestos fibers, paper, cotton or silk or the like, either wrapped or braided or woven or various combinations thereof. The fibrous layer 22 ordinarily will be applied to the conductor 20 and the resinous compositions of this invention applied over the fibrous layer by dipping, die-coating or the like until the fibrous material is saturated and the coatings are then baked to cure the resin. It will be appreciated that the copper conductor may be pretreated with an adhesive composition in order to adhere the layer 22 thereto. Such adhesive composition may comprise an initial tacky coating of the composition of this invention or other resinous compositions such, for example, as polyvinyl alcohol, organosiloxane resins and the like.

The resinous compositions of the present invention may be applied to wire in combination with coatings of other resinous compositions. As illustrated in Fig. 3 of the drawing, the conductor 30 may carry an initial layer 32 composed of a coating of the resinous compositions disclosed herein and a superposed coating 34 of another resin. The coating 34 may be composed of an organosiloxane resin, polyvinyl acetals, phenol formaldehyde, and other resinous compositions or admixtures thereof. In some instances, the order of application of coatings may be reversed over that shown in Fig. 3 so that the uppermost or outer coating comprises the resins of this invention and the underlying coating comprises another resin.

While the invention has emphasized the preparation of enameled wire, it should be understood that the isotropic polyester-amide compositions disclosed herein possess properties that indicate their suitability for many other applications. The coating of sheets of metal to be used for preparing containers for food, oil, and other products, is one desirable use thereof. The effect of most foods, acids, water, and other materials, is negligible on the resinous compositions after heat treatment.

Protective or decorative coatings of all types for metal, carbon bodies, ceramic materials, glass, plastic bodies and the like, may be secured by applying the resins of this composition. Fabrics and other porous or impregnable materials may be treated by coating or impregnating them with the resins disclosed herein.

Since certain obvious changes may be made in the above procedure and different embodiments of the invention could be made without departing from the scope thereof, it is intended that all matter contained in the above description and drawing shall be taken in connection with the accompanying claims and not in a limiting sense.

We claim as our invention:

1. An insulated conductor comprising, in combination, an electrical conductor and hard, tough, solid resinous insulation applied to the electrical conductor, the resinous insulation comprising the reaction product of from 3.8 to 4.0 moles of maleic anhydride, from 1 to 1.2 moles of adipic acid, from 1.2 to 1.6 moles of glycerol, from 2.2 to 2.6 moles of monoethanolamine and from 0.3 to 0.5 mole of ethylene diamine, the reactants having been admixed and reacted by heating at temperatures of between 140° C. and 210° C. to a ball and ring softening temperature of between 45° C. and 90° C. before being applied to the electrical conductor and cured thereon to the solid state.

2. An insulated conductor comprising, in combination, an electrical conductor and hard, tough, solid resinous insulation applied to the electrical conductor, the resinous insulation comprising from 1 to 10 parts by weight of cellulose acetate and from 99 to 90 parts by weight of the reaction product of from 3.8 to 4.0 moles of maleic anhydride, from 1 to 1.2 moles of adipic acid, from 1.2 to 1.6 moles of glycerol, from 2.2 to 2.6 moles of monoethanolamine and from 0.3 to 0.5 mole of ethylene diamine, the reactants in the reaction product having been admixed and reacted by heating at temperatures of between 140° C. and 210° C. to a ball and ring softening temperature of between 45° C. and 90° C. and then admixed with the cellulose acetate before being applied to the electrical conductor and cured thereon to the solid state.

3. An insulated electrical conductor comprising, in combination, an electrical conductor and cured solid resinous insulation applied to the electrical conductor, the resinous insulation comprising the reaction product of from 3.0 to 4.5 moles of at least one unsaturated acidic compound selected from the group consisting of maleic acid, fumaric acid, maleic anhydride, citraconic acid and citraconic anhydride, between 0.5 and 2.0 moles of a saturated dicarboxylic aliphatic acid having from two to eight atoms linked in a straight chain between and attached to the carboxyl groups and having no other reactive group than the carboxyl groups, from 1.5 to 4.7 moles of at least one primary amine-alcohol selected from the group consisting of monoethanolamine and monoisopropanolamine, up to 0.6 mole of at least one primary diamino compound selected from the group consisting of ethylene diamine, 1,3-propylene diamine and urea, the sum of the moles of primary amine-alcohol plus twice the moles of the primary diamine equaling at least 2.2 and not exceeding 4.7, and from 1 to 2.4 moles of at least one polyhydric alcohol selected from the group consisting of glycerol, pentaerythritol and paraffinic glycols having from 1 to 8 carbon atoms in a straight chain and no other reactive groups than the hydroxyl group, not over 50% of the hydroxyl groups of the polyhydric alcohol being supplied by the glycol, the reactants having been admixed and reacted by heating at temperatures of between 140° C. to 210° C. to a ball and ring softening temperature of between 45° C. and 90° C. before being applied to the electrical conductor and cured thereon to the solid state.

4. An insulated electrical conductor comprising, in combination, an electrical conductor and cured solid resinous insulation applied to the electrical conductor, the resinous insulation comprising from 1 to 10 parts by weight of cellulose acetate and from 99 to 90 parts by weight of the reaction product of from 3.0 to 4.5 moles of at least one unsaturated acidic compound selected from the group consisting of maleic acid, fumaric acid, maleic anhydride, citraconic acid and citraconic anhydride, between 0.5 and 2.0 moles of a saturated dicarboxylic aliphatic acid having from two to eight atoms linked in a straight chain between and attached to the carboxyl groups and having no other reactive group than the carboxyl groups, from 1.5 to 4.7 moles of at least one primary amine-alcohol selected from the group consisting of monoethanolamine and monoisopropanolamine, up to 0.6 mole of at least one primary diamino compound selected from the group consisting of ethylene diamine, 1,3-propylene diamine and urea, the sum of the moles of primary amine-alcohol plus twice the moles of the primary diamino compound equaling at least 2.2 and not exceeding 4.7, and from 1 to 2.4 moles of at least one polyhydric alcohol selected from the group consisting of glycerol, pentaerythritol and paraffinic glycols having from 1 to 8 carbon atoms in a straight chain and no other reactive groups than the hydroxyl group, not over 50% of the hydroxyl groups of the polyhydric alcohol being supplied by the glycol, the reactants in the reaction product having been admixed and reacted by heating at temperatures of between 140° C. to 210° C. to a ball and ring softening temperature of between 45° C. and 90° C. and then being admixed with the cellulose acetate before being applied to the electrical conductor and cured thereon to the solid state.

5. An insulated electrical conductor comprising, in combination, an electrical conductor and solid resinous insulation applied to the electrical conductor, the resinous insulation comprising the reaction product of (A) from 3.0 to 4.5 moles of at least one unsaturated acidic compound selected from the group consisting of maleic acid, fumaric acid, maleic anhydride, citraconic acid and citraconic anhydride, (B) between 0.5 and 2.0 moles of a saturated dicarboxylic aliphatic acid having from two to eight atoms linked in a straight chain between and attached to the carboxyl groups, and having no other reactive groups than the carboxyl groups, (C) 0.05 to 0.5 mole of an aliphatic unsaturated monocarboxylic fatty acid having from 16 to 18 carbon atoms in a straight chain terminating in the carboxyl group, (D) from 1.5 to 4.7 moles of at least one primary amine-alcohol selected from the group consisting of monoethanolamine and monoisopropanolamine, (E) up to 0.6 mole of at least one primary diamino compound selected from the group consisting of ethylene diamine, 1,3-propylene-diamine and urea, the sum of the moles of primary amine-alcohol and twice the moles of primary diamino compound equaling at least 2.2 and not exceeding 4.7, and (F) from 1 to 2.4 moles of at least one polyhydric alcohol selected from the group consisting of glycerol, pentaerythritol and paraffinic glycols having from 1 to 8 carbon atoms, not more than 50% of the hydroxyl groups of the polyhydric alcohol being supplied by the glycol, the reactants having been admixed and reacted by heating at temperatures of between 140° C. and 220° C. to a ball and ring softening temperature of from 45° C. to 90° C. before being applied to the electrical conductor and cured thereon to the solid state.

6. An insulated electrical conductor comprising, in combination, an electrical conductor and solid resinous insulation applied to the electrical conductor, the resinous insulation comprising from 1 to 10 parts by weight of cellulose acetate and from 99 to 90 parts by weight of the reaction product of (A) from 3.0 to 4.5 moles of at least one unsaturated acidic compound selected from the group consisting of maleic acid, fumaric acid, maleic anhydride, citraconic acid and citraconic anhydride, (B) between 0.5 and 2.0 moles of a saturated dicarboxylic aliphatic acid having from two to eight atoms linked in a straight chain between and attached to the carboxyl groups, and having no other reactive group than the carboxyl groups, (C) 0.05 to 0.5 mole of an aliphatic unsaturated monocarboxylic fatty acid having from 16 to 18 carbon atoms in a straight chain terminating in the carboxyl group, (D) from 1.5 to 4.7 moles of at least one primary amine-alcohol selected from the group consisting of monoethanolamine and monoisopropanolamine, (E) up to 0.6 mole of at least one primary diamino compound selected from the group consisting of ethylene diamine, 1,3-propylenediamine and urea, the sum of the moles of primary amine-alcohol and twice the moles of the primary diamino compound equaling at least 2.2 and not exceeding 4.7, and (F) from 1 to 2.4 moles of at least one polyhydric alcohol selected from the group consisting of glycerol, pentaerythritol and paraffinic glycols having from 1 to 8 carbon atoms, not more than 50% of the hydroxyl groups of the polyhydric alcohol being supplied by the glycol, the reactants in the reaction product having been admixed and reacted by heating at temperatures of between 140° C. and 220° C. to a ball and ring softening temperature of from 45° C. to 90° C. and then admixing the cellulose acetate before being applied to the electrical conductor and cured thereon to the solid state.

7. An insulated electrical conductor comprising, in combination, an electrical conductor and hard, tough solid resinous insulation applied to the electrical conductor, the resinous insulation comprising the reaction product of from 3.0 to 4.5 moles of at least one unsaturated acidic compound selected from the group consisting of maleic acid, fumaric acid, maleic anhydride, citraconic acid and citraconic anhydride, between 0.5 and 2.0 moles of a saturated aliphatic dicarboxylic acid having from 2 to 8 atoms linked in a straight chain between and attached to the carboxyl groups and having no other reactive group than the carboxyl groups, from 2.2 to 4.7 moles of at least one primary amine-alcohol selected from the group consisting of monoethanolamine and monoisopropanolamine and from 1.0 to 2.8 moles of at least one polyhydric alcohol selected from the group consisting of aliphatic glycols having from 1 to 8 carbon atoms in a straight chain and no other reactive groups than the hydroxyl groups, the reactants having been admixed and reacted by heating at temperatures of between 140° C. and 210 C. to a ball and ring softening temperature of between 45° C. and 90° C. before being applied to the electrical conductor and cured thereon to the solid state.

8. An insulated electrical conductor comprising, in combination, an electrical conductor and hard, tough solid resinous insulation applied to the electrical conductor, the resinous insulation comprising from 1 to 10 parts by weight of cellulose acetate and from 99 to 90 parts by weight of the reaction product of from 3.0 to 4.5 moles of at least one unsaturated acidic compound selected from the group consisting of maleic acid, fumaric acid, maleic anhydride, citraconic acid and citraconic anhydride, between 0.5 and 2.0 moles of a saturated aliphatic dicarboxylic acid having from 2 to 8 atoms linked in a straight chain between and attached to the carboxyl groups and having no other reactive group than the carboxyl groups, from 2.2 to 4.7 moles of at least one primary amine-alcohol selected from the group consisting of monoethanolamine and monoisopropanolamine and from 1.0 to 2.8 moles of at least one polyhydric alcohol selected from the group consisting of aliphatic glycols having from 1 to 8 carbon atoms in a straight chain and no other reactive groups than the hydroxyl groups, the reactants in the reaction product having been admixed and reacted by heating at temperatures of between 140° C. and 210° C. to a ball and ring softening temperature of between 45° C. and 90 C. and then admixed with the cellulose acetate before being applied to the electrical conductor and cured thereon to the solid state.

9. The reaction product of from 3.8 to 4.0 moles of maleic anhydride, from 1 to 1.2 moles of adipic acid, from 1.2 to 1.6 moles of glycerol, from 2.2 to 2.6 moles of monoethanolamine and from 0.3 to 0.5 mole of ethylene diamine, the reactants having been admixed and reacted by heating at temperatures of between 140° C. and 210° C. to a ball and ring softening temperature of between 45° C. and 90° C. before being applied to the electrical conductor and cured thereon to the solid state.

10. The reaction product of from 3.0 to 4.5 moles of at least one unsaturated acidic compound selected from the group consisting of maleic acid, fumaric acid, maleic anhydride, citraconic acid and citraconic anhydride, between 0.5 and 2.0 moles of a saturated dicarboxylic aliphatic acid having from two to eight atoms linked in a straight chain between and attached to the carboxyl groups and having no other reactive group than the carboxyl groups, from 1.5 to 4.7 moles of at least one primary amine-alcohol selected from the group consisting of monoethanolamine and monoisopropanolamine, up to 0.6 mole of at least one primary diamino compound selected from the group consisting of ethylene diamine, 1,3-propylene diamine and urea, the sum of the moles of primary amine-alcohol plus twice the moles of primary diamino compound equaling at least 2.2 and not exceeding 4.7, and from 1 to 2.4 moles of at least one polyhydric alcohol selected from the group consisting of glycerol, pentaerythritol and paraffinic glycols having from 1 to 8 carbon atoms in a straight chain and no other reactive groups than the hydroxyl group, not over 50% of the hydroxyl groups of the polyhydric alcohol being supplied by the glycol, the reactants having been admixed and reacted by heating at temperatures of between 140° C. and 210° C. to a ball and ring softening temperature of between 45° C. and 90° C.

11. The reaction product of (A) from 3.0 to 4.5 moles of at least one unsaturated acidic compound selected from the group consisting of maleic acid, fumaric acid, maleic anhydride, citraconic acid and citraconic anhydride, (B) between 0.5 and 2.0 moles of a saturated dicarboxylic aliphatic acid having from two to eight atoms linked in a straight chain between and attached to the carboxyl groups, and having no other reactive group than the carboxyl groups, (C) 0.05 to 0.5 mole of an aliphatic unsaturated monocarboxylic fatty acid having from 16 to 18 carbon atoms in a straight chain terminating in the carboxyl group, (D) from 1.5 to 4.7 moles of at least one primary amine-alcohol selected from the group consisting of monoethanolamine and monoisopropanolamine, (E) up to 0.6 mole of at least one primary diamino compound selected from the group consisting of ethylene diamine, 1,3-propylene-diamine and urea, the sum of the moles of the primary amine-alcohol plus twice the moles of primary amine equaling at least 2.2 and not exceeding 4.7, and (F) from 1 to 2.4 moles of at least one polyhydric alcohol selected from the group consisting of glycerol, pentaerythritol and paraffinic glycols having from 1 to 8 carbon atoms, not more than 50% of the hydroxyl groups of the polyhydric alcohol being supplied by the glycol, the reactants having been admixed and reacted by heating at temperatures of between 140° C. and 220° C. to a ball and ring softening temperature of from 45° C. to 90° C.

12. The reaction product of from 3.0 to 4.5 moles of at least one unsaturated acidic compound selected from the group consisting of maleic acid, fumaric acid, maleic anhydride, citraconic acid and citraconic anhydride, between 0.5 and 2.0 moles of a saturated aliphatic dicarboxylic acid having from 2 to 8 atoms linked in a straight chain between and attached to the carboxyl groups and having no other reactive group than the carboxyl groups, from 2.2 to 4.7 moles of at least one primary amine-alcohol selected from the group consisting of monoethanolamine and monoisopropanolamine and from 1.0 to 2.8 moles of at least one polyhydric alcohol selected from the group consisting of aliphatic glycols having from 1 to 8 carbon atoms in a straight chain and no other reactive groups than the hydroxyl groups, the reactants having been admixed and reacted by heating at temperatures of between 140° C. and 210° C. to a ball and ring softening temperature of between 45° C. and 90° C.

13. A resinous varnish comprising from 95% to 40% by weight of a solvent composed of at least one selected from the group consisting of cresol, phenol, ethanol, propanol, i opropanol, xylol, monochlorobenzene, and petroleum hydrocarbon distillates boiling in the range of from 130° C. to 185° C., at least 40% of the solvent composed of at least one from the group consisting of phenol and cresol, and from 5% to 60% by weight of the reaction product of from 3.8 to 4.0 moles of maleic anhydride, from 1 to 1.2 moles of adipic acid, from 1.2 to 1.6 moles of glycerol, from 2.2 to 2.6 moles of monoethanolamine and from 0.3 to 0.5 mole of ethylene diamine, the reactants having been admixed and reacted by heating at temperatures of between 140° C. and 210° C. to a ball and ring softening temperature of between 45° C. and 90° C. before being applied to the electrical conductor and cured thereon to the solid state.

14. A resinous varnish comprising from 95% to 40% by weight of a solvent composed of at least one selected from the group consisting of cresol, phenol, ethanol, propanol, isopropanol, xylol, monochlorobenzene, and petroleum hydrocarbon distillates boiling in the range of from 130° C. to 185° C., at least 40% of the solvent composed of at least one from the group consisting of phenol and cresol, and from 5% to 60% by weight of the reaction product of from 3.0 to 4.5 moles of at least one unsaturated acidic compound selected from the group consisting of maleic acid, fumaric acid, maleic anhydride, citraconic acid and citraconic anhydride, between 0.5 and 2.0 moles of a saturated dicarboxylic aliphatic acid having from two to eight atoms linked in a straight chain between and attached to the carboxyl groups and having no other reactive group than the carboxyl groups, from 1.5 to 4.7 moles of at least one primary amine-alcohol selected from the group consisting of monoethanolamine and monoisopropanolamine, up to 0.6 mole of at least one primary diamino compound selected from the group consisting of ethylene diamine, 1,3-propylene diamine and urea, the sum of the moles of primary amine-alcohol plus twice the moles of primary diamino compound equaling at least 2.2 and not exceeding 4.7, and from 1 to 2.4 moles of at least one polyhydric alcohol selected from the group consisting of glycerol, pentaerythritol and paraffinic glycols having from 1 to 8 carbon atoms in a straight chain and no other reactive groups than the hydroxyl group, not over 50% of the hydroxyl groups of the polyhydric alcohol being supplied by the glycol, the reactants having been admixed and reacted by heating at temperatures of between 140° C. and 210° C. to a ball and ring softening temperature of between 45° C. and 90° C.

15. A resinous varnish comprising from 95% to 40% by weight of a solvent composed of at least one selected from the group consisting of cresol, phenol, ethanol, propanol, isopropanol, xylol, monochlorobenzene, and petroleum hydrocarbon distillates boiling in the range of from 130° C. to 185° C., at least 40% of the solvent composed of at least one of the group consisting of phenol and cresol, and from 5% to 60% by weight of the reaction product of (A) from 3.0 to 4.5 moles of at least one unsaturated acidic compound selected from the group consisting of maleic acid, fumaric acid, maleic anhydride, citraconic acid and citraconic anhydride, (B) between 0.5 and 2.0 moles of a saturated dicarboxylic aliphatic acid having from two to eight atoms linked in a straight chain between and attached to the carboxyl groups, and having no other reactive group than the carboxyl groups, (C) 0.05 to 0.5 mole of an aliphatic unsaturated monocarboxylic fatty acid having from 16 to 18 carbon atoms in a straight chain terminating in the carboxyl group, (D) from 1.5 to 4.7 moles of at least one primary amine-alcohol selected from the group consisting of monoethanolamine and monoisopropanolamine, (E) up to 0.6 mole of at least one primary diamino compound selected from the group consisting of ethylene diamine, 1,3-propylenediamine and urea, the sum of the moles of the primary amine-alcohol plus twice the moles of primary amine equaling at least 2.2 and not exceeding 4.7, and (F) from 1 to 2.4 moles of at least one polyhydric alcohol selected from the group consisting of glycerol, pentaerythritol and paraffinic glycols having from 1 to 8 carbon atoms, not more than 50% of the hydroxyl groups of the polyhydric alcohol being supplied by the glycol, the reactants having been admixed and reacted by heating at temperatures of between 140° C. and 220° C. to a ball and ring softening temperature of from 45° C. to 90° C.

16. A resinous varnish comprising from 95% to 40% by weight of a solvent composed of at least one selected from the group consisting of cresol, phenol, ethanol, propanol, isopropanol, xylol, monochlorobenzene and petroleum hydrocarbon distillates boiling in the range of from 130° C. to 185° C., at least 40% of the solvent composed of at least one of the group consisting of phenol and cresol, and from 5% to 60% by weight of the reaction product of from 3.0 to 4.5 moles of at least one unsaturated acidic compound selected from the group consisting of maleic acid, fumaric acid, maleic anhydride, citraconic acid and citraconic anhydride, between 0.5 to 2.0 moles of a saturated aliphatic dicarboxylic acid having from 2 to 8 atoms linked in a straight chain between and attached to the carboxyl groups and having no other reactive group than the carboxyl groups, from 2.2 to 4.7 moles of at least one primary amine-alcohol selected from the group consisting of monoethanolamine and monoisopropanolamine and from 1.0 to 2.8 moles of at least one polyhydric alcohol selected from the group consisting of aliphatic glycols having from 1 to 8 carbon atoms in a straight chain and no other reactive groups than the hydroxyl groups, the reactants having been admixed and reacted by heating at temperatures of between 140° C. and 210° C. to a ball and ring softening temperature of between 45° C. and 90° C.

17. A resinous varnish comprising from 95% to 40% by weight of a solvent composed of at least one selected from the group consisting of cresol, phenol, ethanol, propanol, isopropanol, xylol, monochlorobenzene and petroleum hydrocarbon distillates boiling in the range of from 130° C. to 185° C., at least 40% of the solvent composed of at least one from the group consisting of phenol and cresol, and from 5% to 60% by weight of a solute composed of from 99 to 90 parts by weight of the reaction product of from 3.0 to 4.5 moles of at least one unsaturated acidic compound selected from the group consisting of maleic acid, fumaric acid, maleic anhydride, citraconic acid and citraconic anhydride, between 0.5 and 2.0 moles of a saturated dicarboxylic aliphatic acid having from two to eight atoms linked in a straight chain between and attached to the carboxyl groups and having no other reactive group than the carboxyl groups, from 1.5 to 4.7 moles of at least one primary amine-alcohol selected from the group consisting of monoethanolamine and monoisopropanolamine, up to 0.6 mole of at least one primary diamino compound selected from the group consisting of ethylene diamine, 1,3-propylene diamine and urea, the sum of the moles of primary amine-alcohol plus twice the moles of primary diamino compound equaling at least 2.2 and not exceeding 4.7, and from 1 to 2.4 moles of at least one polyhydric alcohol selected from the group consisting of glycerol, pentaerythritol and paraffinic glycols having from 1 to 8 carbon atoms in a straight chain and no other reactive groups than the hydroxyl group, not over 50% of the hydroxyl groups of the polyhydric alcohol being supplied by the glycol, the reactants having been admixed and reacted by heating at temperatures of between 140° C. and 210° C. to a ball and ring softening temperature of between 45° C. and 90° C., and from 1 to 10 parts by weight of cellulose acetate.

18. A resinous varnish comprising from 95% to 40% by weight of a solvent composed of at least one selected from the group consisting of cresol, phenol, ethanol, propanol, isopropanol, xylol, monochlorobenzene and petroleum hydrocarbon distillates boiling in the range of from 130° C. to 185° C., at least 40% of the solvent composed of at least one of the group consisting of phenol and cresol, and from 5% to 60% by weight of a solute composed of from 99 to 90 parts by weight of the reaction product of from 3.0 to 4.5 moles of at least one unsaturated acidic compound selected from the group consisting of maleic acid, fumaric acid, maleic anhydride, citraconic acid and citraconic anhydride, between 0.5 to 2.0 moles of a saturated aliphatic dicarboxylic acid having from 2 to 8 atoms linked in a straight chain between and attached to the carboxyl groups and having no other reactive group than the carboxyl groups, from 2.2 to 4.7 moles of at least one primary amine-alcohol selected from the group consisting of monoethanolamine and monoisopropanolamine and from 1.0 to 2.8 moles of at least one polyhydric alcohol selected from the group consisting of aliphatic glycols having from 1 to 8 carbon atoms in a straight chain and no other reactive groups than the hydroxyl groups, the reactants having been admixed and reacted by heating at temperatures of between 140° C. and 210° C. to a ball and ring softening temperature of between 45° C. and 90° C., and from 1 to 10 parts by weight of cellulose acetate.

FRANK A. SATTLER.
JOHN R. WOMER.

REFERENCES CITED

The following references are of record in the file of this patent:

UNITED STATES PATENTS

| Number | Name | Date |
|---|---|---|
| 2,312,879 | Christ | Mar. 2, 1943 |